US008371516B2

(12) United States Patent
Eisenmenger

(10) Patent No.: US 8,371,516 B2
(45) Date of Patent: Feb. 12, 2013

(54) FUEL INJECTOR WITH A PRESSURE-COMPENSATED CONTROL VALVE

(75) Inventor: Nadja Eisenmenger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 12/300,016

(22) PCT Filed: Mar. 19, 2007

(86) PCT No.: PCT/EP2007/052550
§ 371 (c)(1),
(2), (4) Date: Nov. 7, 2008

(87) PCT Pub. No.: WO2007/128612
PCT Pub. Date: Nov. 15, 2007

(65) Prior Publication Data

US 2009/0159727 A1 Jun. 25, 2009

(30) Foreign Application Priority Data

May 10, 2006 (DE) ......................... 10 2006 021 736

(51) Int. Cl.
*B05B 1/30* (2006.01)
*F02M 51/00* (2006.01)
*F02M 61/00* (2006.01)
*F02M 39/00* (2006.01)
*F16K 31/02* (2006.01)

(52) U.S. Cl. ............... 239/585.3; 239/533.2; 239/533.3; 239/533.9; 239/584; 239/585.1; 251/129.16

(58) Field of Classification Search ............... 239/533.2, 239/533.3, 533.8, 533.9, 533.11, 533.12, 239/584, 585.1, 585.2, 585.3, 585.4, 585.5; 251/129.02, 129.1, 129.16, 129.18, 129.19
See application file for complete search history.

(56) References Cited

U.S. PATENT DOCUMENTS

| | | | | |
|---|---|---|---|---|
| 4,482,094 | A * | 11/1984 | Knape | 239/88 |
| 4,678,160 | A * | 7/1987 | Yamada et al. | 251/129.02 |
| 4,832,314 | A * | 5/1989 | Trott | 251/129.16 |
| 4,848,727 | A | 7/1989 | Nanbu et al. | |
| 4,905,907 | A | 3/1990 | Ricco | |
| 7,458,529 | B2 * | 12/2008 | Ricco et al. | 239/585.3 |
| 2006/0000453 | A1 | 1/2006 | Ricco et al. | |

FOREIGN PATENT DOCUMENTS

| | | | |
|---|---|---|---|
| DE | 3801035 | A1 | 10/1988 |
| EP | 0304744 | A1 | 3/1989 |
| EP | 1319827 | A2 | 6/2003 |
| EP | 1612403 | A1 | 1/2006 |
| WO | 03002868 | A1 | 1/2003 |

* cited by examiner

*Primary Examiner* — Ryan Reis
(74) *Attorney, Agent, or Firm* — Michael Best & Friedrich LLP

(57) ABSTRACT

In a fuel injector for injecting fuel into a combustion chamber of an internal combustion engine, an injection valve member for opening and closing at least one injection opening is triggered by a control valve embodied as a magnet valve. On the armature of the magnet valve, a sealing face is embodied that for closing the control valve is positionable into a valve seat. The armature of the magnet valve is movable, without armature guidance, between an upper and a lower stroke stop. Because the sealing face, which for closing the control valve is positionable into the valve seat, is embodied on the armature, an additional closing element of the kind provided in the prior art can be dispensed with.

14 Claims, 4 Drawing Sheets

FUEL INJECTOR WITH A PRESSURE-COMPENSATED CONTROL VALVE

CROSS-REFERENCE TO RELATED APPLICATION

This application is a 35 USC 371 application of PCT/EP 2007/052550 filed on Mar. 19, 2007.

BACKGROUND OF THE INVENTION

1. Field of the Invention

The invention relates to an injector for injecting fuel into a combustion chamber of an internal combustion engine.

2. Description of the Prior Art

An injector for injecting fuel into a combustion chamber of an internal combustion engine, in which an injection valve member is triggered via a magnet-operated control valve, is known for instance from European Patent Disclosure EP-A 1 612 403. With the aid of the control valve, an outlet throttle restriction from a control chamber into the fuel return can be closed or opened. The control chamber is defined on one side by a control piston, with which an injection valve member is triggered that opens or closes at least one injection opening into the combustion chamber of the engine. The outlet throttle restriction is received in a body that is provided with a tapering valve seat on the side remote from the control chamber. A closing element that is connected to the armature of the magnet valve is positionable into this valve seat. For that purpose, an edge that is positioned against the conically shaped seat is embodied on the closing element. The closing element moves on an axial rod that is joined integrally to the body in which the outlet throttle restriction is embodied.

For the valve to close in fluid-tight fashion, it is necessary to produce high-precision surfaces and to provide a high-precision fit of the closing element on the axial rod. As a result, the closing element is exactly guided and it is thus assured that it closes the seat in fluid-tight fashion.

ADVANTAGES AND SUMMARY OF THE INVENTION

In a fuel injector embodied according to the invention for injecting fuel into a combustion chamber of an internal combustion engine, an injection valve member for opening and closing at least one injection opening is triggered by a control valve embodied as a magnet valve. On the armature of the magnet valve, a sealing face is embodied that for closing the control valve is positionable into a valve seat. The armature of the magnet valve is movable, without armature guidance, between an upper and a lower stroke stop. Because the sealing face, which for closing the control valve is positionable into the valve seat, is embodied on the armature, an additional closing element of the kind provided in the prior art can be dispensed with. As a result, the mass of the moving parts can be minimized. Because the mass of the moving parts is minimized, shorter switching times can be attained. A further advantage of embodying the sealing face directly on the armature of the magnet valve is that the magnet valve requires only little installation space as a result.

A fluid-tight closure of the magnet valve by positioning the sealing face on the armature into the valve seat is attained by aligning the seating face on the armature with the lower stroke stop. In a preferred embodiment this alignment is effected by means of a resilient guide lip that is embodied on the armature. The guide lip is preferably embodied on the outside diameter of the armature. If in the closing motion the armature then begins to wobble, the armature is first struck by the guide lip. In the further motion, because the guide lip is embodied resiliently, the armature is aligned in such a way that the sealing face on the armature rests flat on the valve seat, thus creating a fluid-tight connection. The motion of the armature into the lower stroke stop is embodied with the aid of a spring element. The spring element is preferably a spiral spring embodied as a compression spring. So that the force will be introduced as closely as possible to the vicinity of the valve seat, the inside diameter of the spring element is preferably essentially equivalent to the inside diameter of the valve seat. Because of the elasticity of the resilient guide lip, it is attained that only little of the spring force of tie spring element is lost at the guide lip.

In a preferred embodiment, the guide lip and the sealing face on the armature, and the bearing face and the valve seat of the control valve, are ground to the same height. As a result, the valve seat of the magnet valve can be manufactured economically, since pairing it with a second component is dispensed with.

The upper stroke stop is preferably formed by an annular face. As a result of striking the annular face, the armature, which can begin to wobble during the centrifugal phase, aligns itself again.

To attain an axial pressure equilibrium, the armature is preferably designed such that the diametrically opposed faces on which an axial pressure force acts are of equal size and are acted upon by the same pressure. To attain this, a bore is made in the armature, and its diameter is essentially equivalent to the inside diameter of the valve seat. For receiving the pressure forces, a pressure rod is received in the bore. To keep the fuel leakage flow through the gap between the bore and the pressure rod as slight as possible, the bore in a preferred embodiment is honed. The pressure rod and the bore are also manufactured with narrow guide play. However, to obtain a precise perpendicular orientation of the sealing face and the bore, however, it is not necessary for the bore and the sealing face on the armature to be made in a vise. As a result, the manufacture of the armature is simplified.

In general, the bearing face and the valve seat are embodied on a valve element. This valve element is received in the injector housing. By embodying the bearing face and the valve seat on the valve element, it is possible to produce them both on an outer surface. It is unnecessary for an end face of a bore to be ground plane.

The spring force of a spring element, by which the motion of the armature into the valve seat is reinforced by the magnet, is preferably adjusted by a disk. This is effected by providing that the spring element is prestressed by the disk. The greater the axial length of the disk, the more strongly the spring element is prestressed, and the greater is the spring force that acts on the armature.

In general, the disk is disposed on the side of the spring element facing away from the armature. However, in a preferred embodiment, the disk is disposed between the spring element and the armature. The advantage of this disposition is that the disk, with which the spring force is adjusted, can thus additionally be used for centering the armature.

To prevent the armature from tilting in the opening and closing motion, in a further embodiment, the pressure rod includes a pressure pin and a bolt, and the bolt is received in a bore in the armature, and the pressure pin is surrounded by the spring element. The tilting is avoided in particular by providing that the bolt is tiltable relative to the pressure pin. This is achieved for example by providing that the ends, facing toward one another, of the pressure pin and of the bolt are embodied spherically, or in other words preferably in the form of a portion of a ball. Alternatively, it is also possible for a ball to be received between the pressure pin and the bolt. Any other design known to one skilled in the art, with which the bolt can be bent out of the axial alignment relative to the pressure pin is also possible.

BRIEF DESCRIPTION OF THE DRAWINGS

The invention will be described in further detail below in conjunction with the drawings, in which.

DESCRIPTION OF THE PREFERRED EMBODIMENTS

Figure 1:
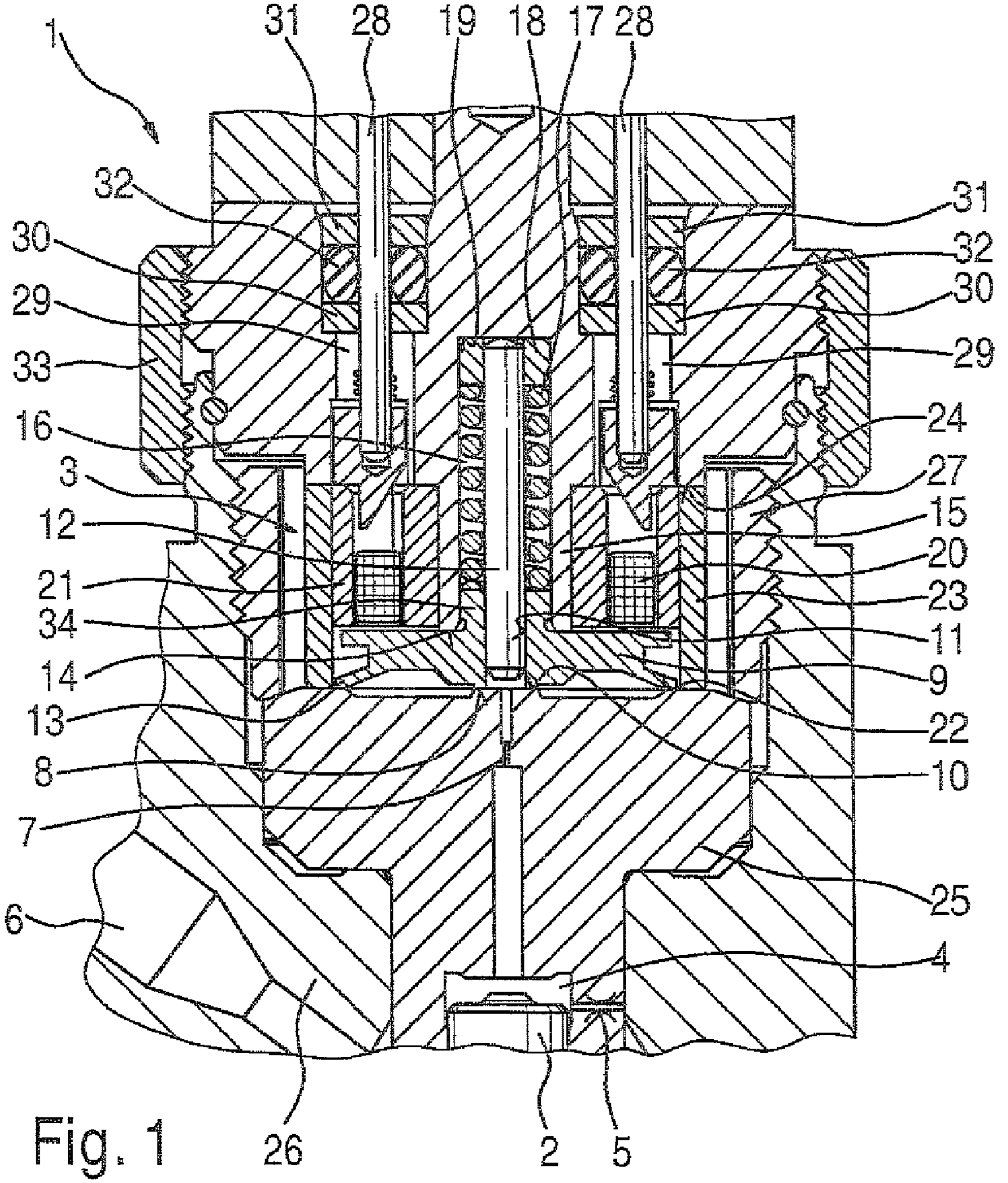
FIG. 1 is a detail of a fuel injector with a magnet valve embodied according to the invention, in a first embodiment; embodiment.

FIG. 1 shows a detail of a fuel injector, embodied according to the invention, with a magnet valve in a first embodiment.

In a fuel injector 1 embodied according to the invention, a control piston 2, with which an injection valve member, not shown here, is triggered, is triggered by a magnet valve 3. By means of the injection valve member, at least one injection opening is opened or closed, and the injection of fuel into a combustion chamber of an internal combustion engine is thus controlled.

The motion of the control piston 2 is effected hydraulically. To that end, the control piston 2 discharges, with its end remote from the injection valve member, into a control chamber 4. Via an inlet throttle restriction 5, the control chamber 4 communicates with a fuel return 6. As a result, fuel under system pressure can flow into the control chamber 4. Via an outlet throttle restriction 7, the control chamber 4 can be relieved. To that end, the outlet throttle restriction 7 communicates hydraulically with a return, not show in FIG. 1. To enable filling the control chamber 4 with fuels that are at system pressure, the outlet throttle restriction 7 is closable with the aid of the magnet valve 3. To that end, in the magnet valve 3 embodied according to the invention, a sealing face 8, which is embodied on the armature 9 of the magnet valve 3, is put into a valve seat 10. In the embodiment shown here, the sealing face 8 and the valve seat 10 form a flat seat. However, any other valve seat known to one skilled in the art, in which axial forces do not act on the closing element, is also conceivable.

In order to receive the pressure force acting in the axial direction when the magnet valve 3 is closed, a bore 11, in which a pressure rod 12 is received, is made in the armature 9. So that when the valve is closed no axial pressure forces will act on the armature 9, the diameter of the bore 11 is essentially equal to the inside diameter of the sealing face 8. A further task of the pressure rod 12 is to seal off the bore 11 from leakage flows. For this reason, it is necessary that the pressure rod 12 and the bore 11 be made with narrow guide play. Unlike the fuel injectors known from the prior art, however, it is unnecessary for the bore 11 and the sealing face 8 on the armature 9 to be made in a vise in order to obtain a precise perpendicular orientation of the sealing face 8 and the bore 11. As a result, the manufacture of the armature 9 is simplified.

For aligning the armature 9 on the lower stroke stop, or in other words when the sealing face 8 is in the valve seat 10, an elastic guide lip 13 is embodied on the armature. The upper stroke stop of the armature 9 is formed by an annular face 14, which is embodied as a lower end face of a stroke stop sleeve 15.

In the embodiment shown here, a bore 16 in which a spring element 17 is received is embodied in the stroke stop sleeve 15. The spring element 17 is preferably a spiral spring embodied as a compression spring, which is braced by one end on the armature 9 and by the other on a disk 18. The disk 18 is positioned against an end face 19 of the bore 16. By means of the axial length of the disk 18, the spring force with which the spring element 17 acts on the armature 9 can be adjusted.

The magnet valve 3 furthermore includes a magnet 20, which is received in a magnet core 21. The power supply to the magnet 20 is effected via pins 28.

To achieve a plane contact of the sealing face 8 with the armature 9 on the valve seat 10, both the valve seat 10 and a bearing face 22, on which the elastic guide lip 13 rests when the armature 9 is located on the lower stroke stop, are ground to the same height. In the same way, the contact of the elastic guide lip 13, which rests on the bearing face 22, and the sealing face 8 on the armature 9 are ground to the same height.

The stroke of the armature 9 is limited by the stroke stop sleeve 15. To adjust the stroke stop, the armature 9 and the magnet core 21 are surrounded by a sleeve 23, by whose axial length the stroke is defined. For adjusting the stroke, the stroke stop sleeve 15 rests with one end face 24 on the sleeve 23.

The inlet throttle restriction 5, the outlet throttle restriction 7, and the valve seat 10 and the bearing face 22 are embodied on a valve element 25, which is received in the injector housing 26. Securing the valve element 25 in the injector housing 26 is done by means of a valve tightening screw 27.

To guide the pins 28 by means of the stroke stop sleeve 15, there is bore 29 in the stroke stop sleeve for each pin 28. For sealing and centering the pins 28 of the bore 29, the pins 28 are each surrounded by a lower disk 30, an upper disk 31, and a scaling ring 32 located between them.

Securing the stroke stop sleeve 15 to the injector housing 26 is done in the embodiment shown here with the aid of a tension nut 33.

The magnet valve 3 embodied according to the invention can be used both in inversely triggered fuel injectors and noninversely triggered fuel injectors.

To start the injection event, in a noninversely triggered fuel injector, the magnet 20 of the magnet valve 3 is supplied with current. Noninversely triggered means that when the magnet is receiving current, the at least one injection opening is open and fuel is injected into the combustion chamber of the engine. Supplying current to the magnet 20 causes a magnetic field to develop, by which the armature 9 is attracted by the magnet 20 and thus moves in the direction of the magnet 20. As a result, the sealing face 8 of the armature 9 lifts from the valve seat 10, and a connection to the return, not shown here, is opened from the control chamber 4 via the outlet throttle restriction 7. Because of the opened connection, fuel can flow out of the control chamber 4. This causes a pressure drop in the control chamber 4. As a result of the pressure drop in the control chamber 4, the pressure force that acts on the control piston 2 drops, and the control piston 2 is moved into the control chamber 4. As a result of this motion of the control piston 2, the injection valve member lifts from its seat and thus uncovers the at least one injection opening. The injection event begins.

The stroke of the armature 9 is limited by the stroke stop sleeve 15 because the armature 9 strikes the annular face 14 of the stroke stop sleeve 15.

Axial guidance of the armature 9 is effected by means of an extension 34 on the armature 9, which is guided in the bore 16 in the stroke stop sleeve 15. To facilitate the production of the fuel injector, however, the bores 16 and the extension 34 on the armature 9 are not ground in pairs, so that despite the slight stroke, which generally ranges between 0.02 and 0.04 millimeters, wobbling of the armature 9 cannot be prevented.

Upon closure of the outlet throttle restriction 7, which ends the injection event, in order to assure that the sealing face 8 on the armature 9 is put into tile valve seat 10 in fluid-tight fashion, the resilient guide lip 13 is embodied on the armature 9. By means of the resilient guide lip 13, the armature 9 is prevented from tilting, even in the event of a spring force of the spring element 17 that acts unevenly on the armature. If tilting of the armature 9 does occur, the resilient guide lip 13 strikes the bearing face 22 and thereby prevents further tilting of the armature 9.

To terminate The injection event, the supply of current to the magnet 20 is ended. With the aid of the spring element 17, the armature 9 is moved away by the magnet, so that the sealing face 8 moves into the valve seat 10. The outlet throttle restriction 7 is closed as a result. In the control chamber 4, which is filled with fuel at system pressure via the fuel inlet 6 and the inlet throttle restriction 5, system pressure builds up again. As a result, the pressure force that acts on the control piston 2 rises. The control piston 2 is moved in the direction of the injection valve member and thus causes the injection valve member to move into its seat and hence close the at least one injection opening.

An inversely triggered fuel injector is distinguished from the noninversely triggered fuel injector in that with the magnet receiving current, the at least one injection opening is closed and when the magnet is not receiving current the at least one injection opening is open. To that end, the control piston 2 and the injection valve member are hydraulically coupled to one another in such a way that upon a motion of the control piston 2 in the direction of the injection valve member, the injection valve member is lifted from its seat and opens the at least one injection opening, and when the magnet is receiving current, the control piston 2 is moved in the direction of the control chamber 4, as a result of which the injection valve member is moved into its seat and closes the at least one injection opening.

Figure 2:
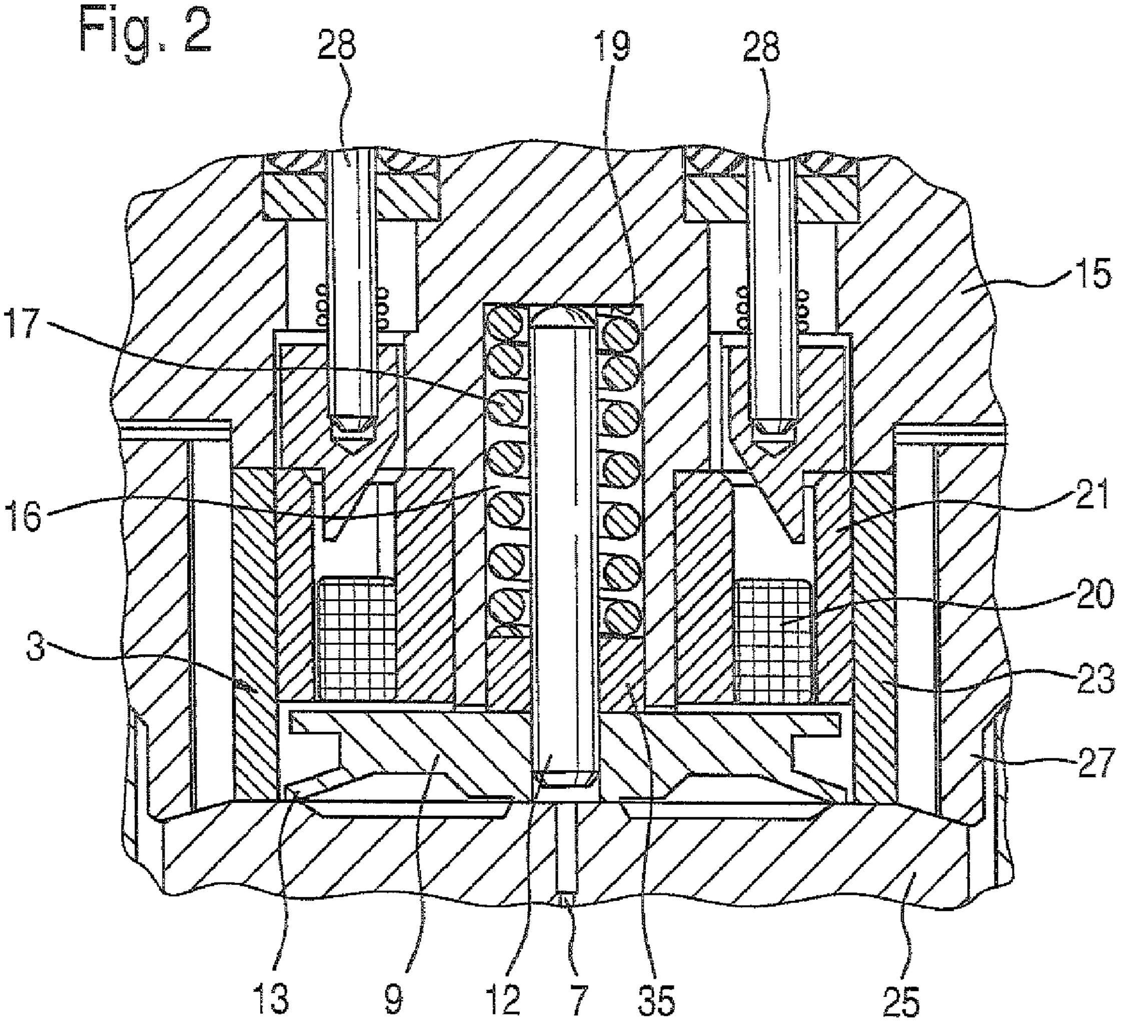
FIG. 2 shows a magnet valve, embodied according to the invention, in a second embodiment.

In FIG. 2, a second embodiment of a magnet valve 3 embodied according to the invention is shown. The embodiment shown in FIG. 2 differs from the embodiment shown in FIG. 1 in that a disk 35, with which the spring force of the spring element 17 is adjusted, is received between the spring element 17 and the armature 9. Thus the spring element 17 is braced by one end against the disk 35 and by the other against the end face 19 of the bore 16. As a result of the embodiment shown in FIG. 2, the disk 35 simultaneously serves to center the armature 9. The centering of the armature 9 is necessary so that the armature will not be shifted radially and thus to prevent the sealing face 8 on the armature 9 from no longer being placed on the valve seat 10 when the outlet throttle restriction 7 is closed.

Figure 3:
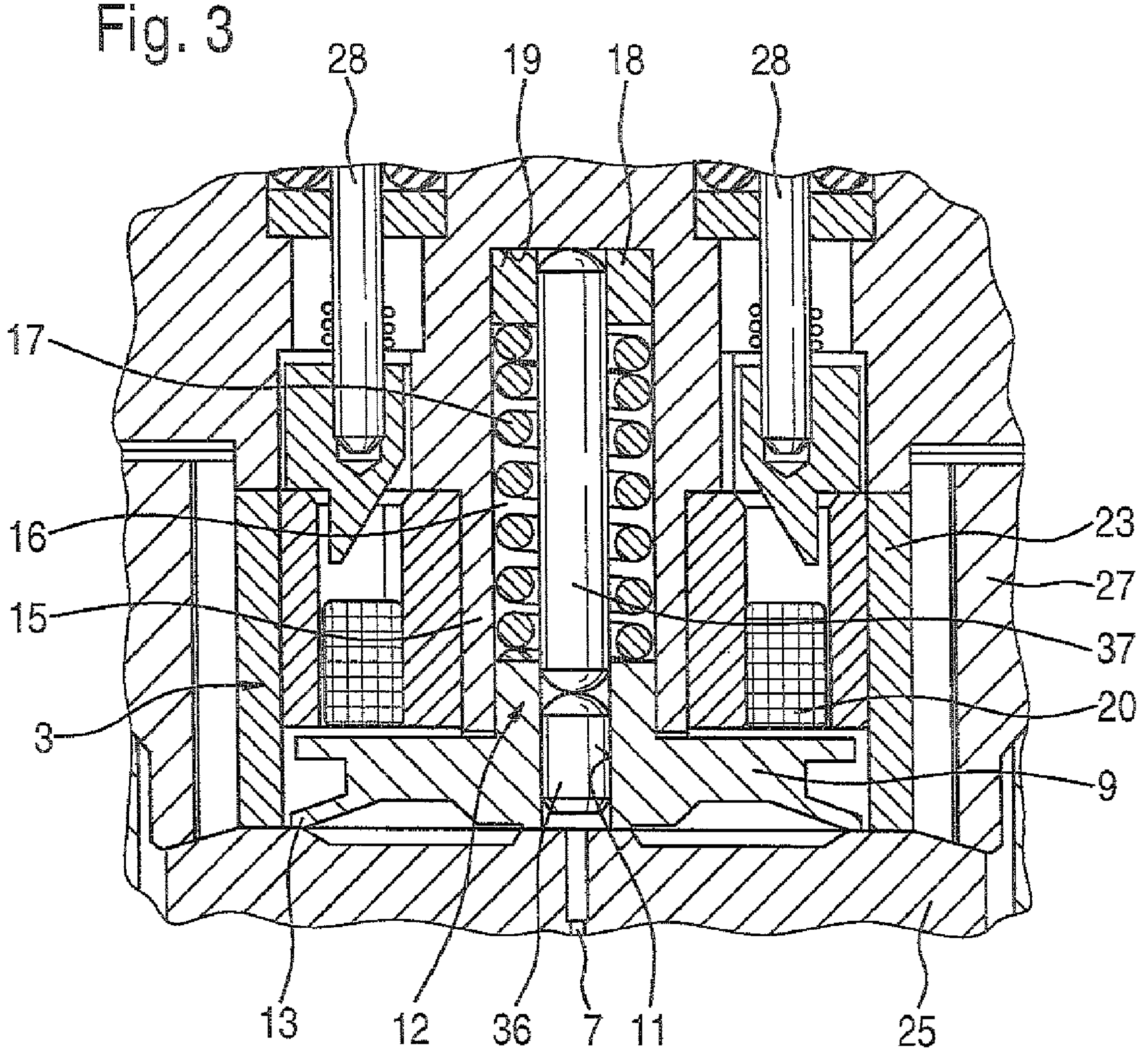
FIG. 3 shows a magnet valve, embodied according to the invention, in a third embodiment.
Figure 4:
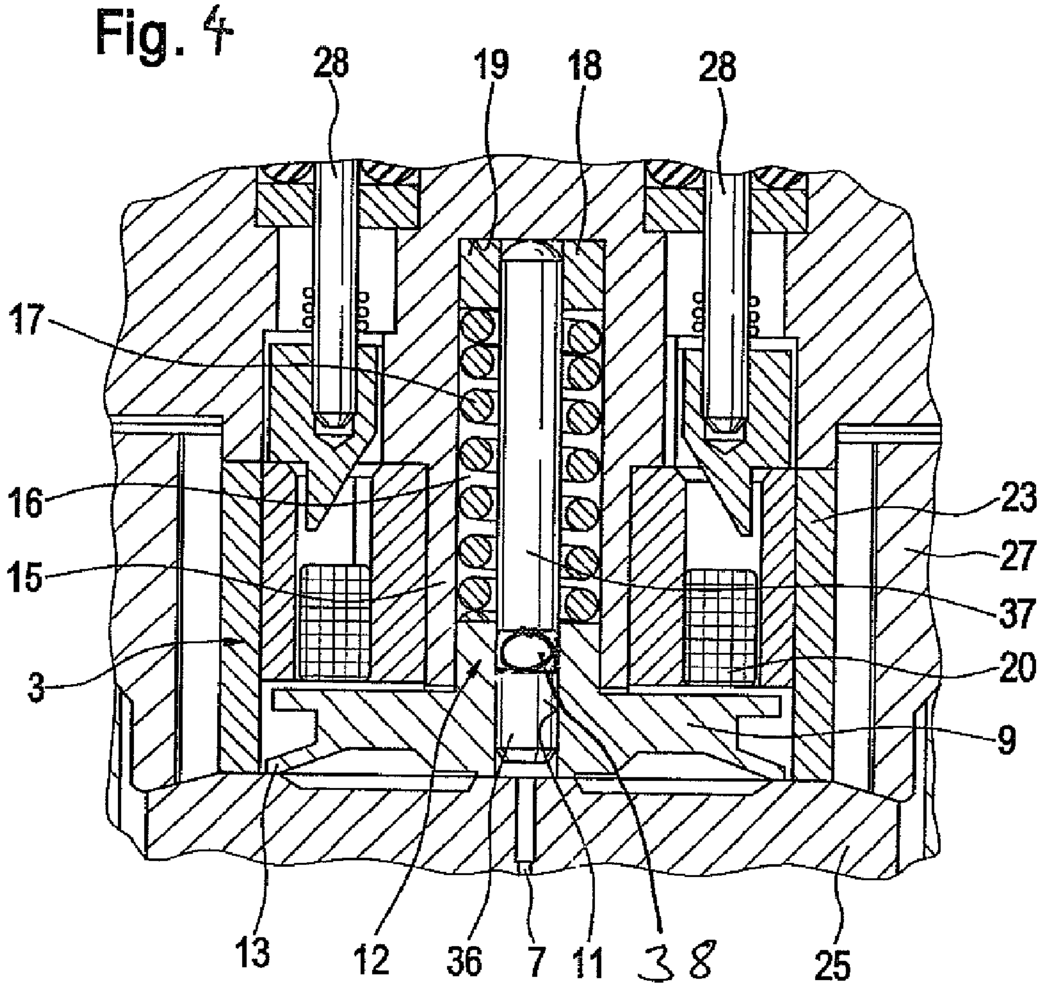
FIG. 4 shows a magnet valve, embodied according to the invention, in a fourth embodiment.

FIG. 3 shows a magnet valve 3 in a third embodiment.

The embodiment shown in FIG. 3 differs from the embodiment shown in FIG. 1 in that the pressure rod 12 includes a bolt 36 and a pressure pin 37. The bolt 36 is guided in the bore 11 in the armature 9. Because the pressure rod 12 includes the pressure pin 37 and the bolt 36, the armature 9 on the pressure rod 12 is prevented from being able to tilt if it begins to wobble in response to an uneven exertion of force by the spring element 17. For this purpose, the bolt 36 and the pressure pin 37 are embodied in such a way that the bolt 36 can tilt out of the axial direction relative to the pressure pin 37. Preferably, for this purpose at least either the pressure pin 37, on the side toward the bolt 36, or the bolt 36, on the side toward the pressure pin 37, is provided with a spherically embodied end face. Spherically embodied here means that the end face is embodied in the form of a portion of a sphere, or as a paraboloid or hyperboloid. In a preferred embodiment, both the end face of the pressure pin 37 toward the bolt 36 and the end face of the bolt 36 toward the pressure pin 37 are embodied spherically.

In the fourth embodiment, a ball is received between the bolt 36 and the pressure pin 37. In that case, the ball has the same task as the spherically embodied end faces, facing one another, of the bolt 36 and of the pressure pin 37.

The task of the pressure rod 12, in all three exemplary embodiments as shown in FIGS. 1 through 3, is to receive axial pressure forces. To that end, the pressure rod 12 is braced against the end face 19 of the bore 16 in the stroke stop sleeve 15. As a result, the pressure force exerted on the pressure rod 12 is transmitted to the stroke stop sleeve 15.

Besides the embodiments shown in FIGS. 1 through 3, in which the spring element 17 or the disk 18 and the pressure rod 12 are braced against the end face 19 of the bore 16 in the stroke stop sleeve 15, it is also possible for the bore 16 to penetrate the stroke stop sleeve completely and for the disk 18 or the spring element 17 and the pressure rod 12 to be braced directly on the injector housing. In that case, the bore 16 is closed by the injector housing.

The foregoing relates to the preferred exemplary embodiments of the invention, it being understood that other variants and embodiments thereof are possible within the spirit and scope of the invention, the latter being defined by the appended claims.

The invention claimed is:

1. A fuel injector for injecting fuel into a combustion chamber of an internal combustion engine, comprising:

an injection valve member for opening and closing at least one injection opening;

control valve embodied as a magnet valve for triggering the injection valve member;

a sealing face embodied on an armature of the magnet valve, the sealing face being positioned into a valve seat of a valve element to close the control valve; and a pressure rod which is a separate element from the valve element, being received in a bore in the armature for receiving axial pressure forces, a diameter of the bore being essentially equal to an inside diameter of the sealing face, the pressure rod being directly braced against an end face of a bore in a stroke stop sleeve thereby transmitting the axial pressure forces from the pressure rod to the end face in the stroke stop sleeve, wherein the armature is movable without armature guidance between an upper stroke stop and a lower stroke stop, wherein a resilient guide lip is embodied on the armature and rests on the lower stroke stop on a bearing face thereof which is radially spaced apart from the valve seat, so that the armature is aligned and the bearing face and the valve seat of the valve element are ground to the same height, and wherein the guide lip is embodied on an outside diameter of the armature.

2. The fuel injector as defined by claim 1, wherein the upper stroke stop is formed by an annular face of a stroke stop.

3. The fuel injector as defined by claim 1, wherein the pressure rod has a diameter approximately equal to an inside diameter of the valve seat.

4. The fuel injector as defined by claim 2, wherein the pressure rod has a diameter approximately equal to an inside diameter of the valve seat.

5. The fuel injector as defined by claim 1, wherein the bearing face and the valve seat are embodied on the valve element.

6. The fuel injector as defined by claim 2, wherein the bearing face and the valve seat are embodied on the valve element.

7. The fuel injector as defined by claim 4, wherein the bearing face and the valve seat are embodied on the valve element.

8. The fuel injector as defined by claim 3, wherein the bearing face and the valve seat are embodied on the valve element.

9. The fuel injector as defined by claim 1, wherein a spring force of a spring element, by which a motion of the armature moving into the valve seat is reinforced by the magnet, is adjusted by a disk.

10. The fuel injector as defined by claim 5, wherein a spring force of a spring element, by which a motion of the armature moving into the valve seat is reinforced by the magnet, is adjusted by a disk.

11. The fuel injector as defined by claim 9, wherein the disk is received between the armature and the spring element and is thus additionally used for centering the armature.

12. The fuel injector as defined by claim 1, wherein the pressure rod includes a pressure pin and a bolt, and the bolt is received in a bore in the armature, and the pressure pin is surrounded by the spring element.

13. A fuel injector for injecting fuel into a combustion chamber of an internal combustion engine, comprising:

an injection valve member for opening and closing at least one injection opening;

control valve embodied as a magnet valve for triggering the injection valve member;

a sealing face embodied on an armature of the magnet valve, the sealing face being positioned into a valve seat of a valve element to close the control valve; and a pressure rod received in a bore in the armature for receiving axial pressure forces, wherein the armature is movable without armature guidance between an upper and a lower stroke stop, wherein the pressure rod includes a pressure pin and a bolt, and the bolt is received in a bore in the armature, and the pressure pin is surrounded by the spring element, and wherein an end of the bolt and an end of the pressure pin pointing toward one another are embodied spherically.

14. A fuel injector for injecting fuel into a combustion chamber of an internal combustion engine, comprising:

an injection valve member for opening and closing at least one injection opening;

control valve embodied as a magnet valve for triggering the injection valve member;

a sealing face embodied on an armature of the magnet valve, the sealing face being positioned into a valve seat of a valve element to close the control valve; and a pressure rod received in a bore in the armature for receiving axial pressure forces, wherein the armature is movable without armature guidance between an upper and a lower stroke stop, wherein the pressure rod includes a pressure pin and a bolt, and the bolt is received in a bore in the armature, and the pressure pin is surrounded by the spring element, and wherein a ball is received between the bolt and the pressure pin.

* * * * *

UNITED STATES PATENT AND TRADEMARK OFFICE

CERTIFICATE OF CORRECTION

PATENT NO. : 8,371,516 B2
APPLICATION NO. : 12/300016
DATED : February 12, 2013
INVENTOR(S) : Nadja Eisenmenger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this
First Day of September, 2015

Michelle K. Lee
*Director of the United States Patent and Trademark Office*